United States Patent [19]

Chasek

[11] Patent Number: 5,420,405

[45] Date of Patent: May 30, 1995

[54] SECURE, AUTOMATED TRANSACTION SYSTEM THAT SUPPORTS AN ELECTRONIC CURRENCY OPERATING IN MIXED DEBIT & CREDIT MODES

[76] Inventor: Norman E. Chasek, 24 Briar Brae Rd., Stamford, Conn. 06903

[21] Appl. No.: 23,120

[22] Filed: Feb. 26, 1993

[51] Int. Cl.6 .................................. G06F 15/30
[52] U.S. Cl. ............................ 235/379; 235/380; 902/4
[58] Field of Search ............ 235/379, 380; 402/4

[56] References Cited

U.S. PATENT DOCUMENTS

| | | | |
|---|---|---|---|
| 4,277,837 | 7/1981 | Stuckert | 235/380 |
| 4,303,904 | 12/1981 | Chasek | 235/384 |
| 4,454,414 | 6/1984 | Benton | 235/380 |
| 4,614,861 | 9/1986 | Paulou et al. | 235/380 |
| 4,630,201 | 12/1986 | White | 902/4 |
| 4,689,478 | 8/1987 | Hale et al. | 235/380 |
| 4,766,293 | 8/1988 | Boston | 235/379 |
| 4,859,837 | 8/1989 | Halpern | 235/380 |
| 4,906,828 | 3/1990 | Halpern | 235/379 |
| 4,968,873 | 11/1990 | Dethloff et al. | 235/379 |
| 5,175,416 | 12/1992 | Mansvelt et al. | 235/380 |

Primary Examiner—John Shepperd

[57] ABSTRACT

This invention describes a combination of methods and apparatus that creates electronic money for personal transactions which integrates the functions of cash, checks and credit cards with constant surveilance against fraud. This money can also serve as an international medium-of-exchange, and support automated sales tax collections and payment. This money's support system is comprised of personal terminals, vendor terminals, an electronic banking sub-system, and homebase terminals. Such a system, if widely used, would increase commercial and personal productivity, provide better security against fraud and counterfeiting, facilitate the automation of operations that involve currency, and sharply diminish the flood of paper that threatens to inundate the present system.

8 Claims, 7 Drawing Sheets

SECURE, AUTOMATED TRANSACTION SYSTEM THAT SUPPORTS AN ELECTRONIC CURRENCY OPERATING IN MIXED DEBIT & CREDIT MODES

BACKGROUND FOR INVENTION

Currency is money in circulation and is used in the hand-to-hand settlement of simple transactions without independent reference to the standing of the payer. A currency transaction consists of debiting the payer's on-person cash supply while adding the same amount to the payee's cash supply. Currency, checks, and credit cards are transactional vehicles. Implicit to the success of all transactional vehicles is trust, which requires strong defenses against fraud, and counterfeiting.

Any true money system must be capable of serving as a national, or international, medium of exchange; it must readily circulate; it must have easily recognized values; it must be transferable in a variety of transactions; its value must be difficult to dilute by counterfeiting; and it must have a guarantor.

It is contended that an advanced money would lend itself to automated transactions, handle mixed debit & credit transactions, and keep track of personal accounts in an on-person terminal. Physically, the on-person terminal should easily fit into a pocket and not require manual dexterity or above average intelligence in its use.

This invention incorporates aspects of a universal toll paying system described in U.S. Pat. No. 4,303,904, in that the toll paying uses point-of-sale debiting via-.radio signals, and also credits are inserted within the in-vehicle terminal electronically. The use of a radio medium at the point-of-sale speeds transaction times, making it especially efficient for automated, dynamic, mass applications.

SUMMARY OF INVENTION

This electronic money system uses as its medium-of-exchange packets of bytes that identify the personal account custodian or PAC, payer, amount of transaction, type of transaction, vendor, and provides a security number, and a national code. This group of bytes is referred to as a transaction packet. The packet is created at the point-of-sale and incorporates all the information needed to completely consumate, or settle, each transaction. When the transaction is settled, the packet loses its link between the payer and transaction.

This electronic money system has three principal activity areas; point-of-transaction, homebase, and the electronic banking system. The complete system is comprised of six subsystems; 1) personal terminals, PT, 2) vendor terminals, VT, 3) homebase terminals, HBT, 4) personal account custodian, PAC, terminals, 5) vendor account custodian, VAC, terminals, and 6) an electronic clearinghouse. The point-of-sale is where a personal and a vendor terminal, or two personal terminals, initiate the first step of the transaction. Homebase might be a private residence or workplace. The electronic banking system is comprised of PACs, VACs and clearinghouses.

The personal terminal should be about the size of a thick credit card. Its preferred embodiment incorporates a microwave receiver/transmitter, or R/T, With antenna, various memory elements, addition and subtraction registers, a crypto gate, a visual display, a rechargable battery and a transaction number assigner.

The vendor terminal includes an R/T, a transaction amount inserting key or number pad, a calendar-time clock, memory, and visual display.

The personal account custodian or PAC terminal includes a crypto entry code decypherer, PT interrogater, account computer, account reconciliation scanner, transaction sequence correlator, and interfaces to HBT telephone and the clearinghouse.

The vendor account custodian, or VAC, terminal includes interfaces for telephone and clearinghouse, vendor dialer, and account computer. The homebase terminal includes a telephone number ROM, and PT/modem interface. The clearinghouse transfers transaction packets between the various VACs and PACs.

System security is realized by lost & stolen electronic files, cross checks of running account balances, a crypto process for inserting PT credits, and correlations between transaction sequenced numbers and calendar-clock numbers.

Debit transactions are registered in a running account held within the PT. Credit transactions, up to designated limits, are conducted at the option of the payer, by switching from subtraction to addition in a running account.

The availability of zero current drain memory elements known as flash memories or electronically erasable programable read only memories, EEPROMs, make it possible to retain information for long periods without draining the PT's battery. The transaction processers draw current only when a transaction is in process.

The homebase terminal, HBT, employs a modem which adapts any telephone into a remote terminal for recharging debit and credit accounts, and for paying bills or settling person-to-person transactions.

The system is easily converted from a national to an international money system through a national code that is stored in the PT indicating its native money denomination. Vendor terminals using currency translators convert each PT's denomination into the local currency and consumate the transaction back through designated VACs and PACs.

The system can also be adapted to execute automated sales tax collections and payments by inserting appropriate multiplying and accumulating registers into the vendor's terminals and adding memories and a printer into VAC terminals.

The various aspects and advantages of this invention will be more fully understood from a consideration of the following detailed description in conjunction with the accompanying drawings, in which.

Figure 2A:
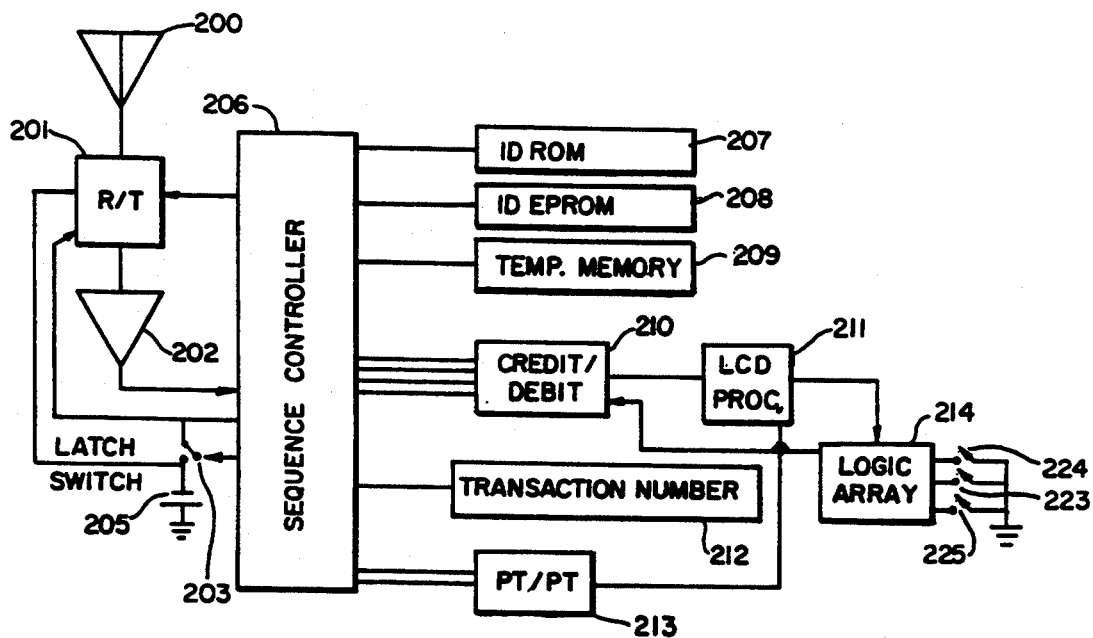

FIG. 2a describes a personal terminal (PT) configuration in block diagram.

Figure 2B:
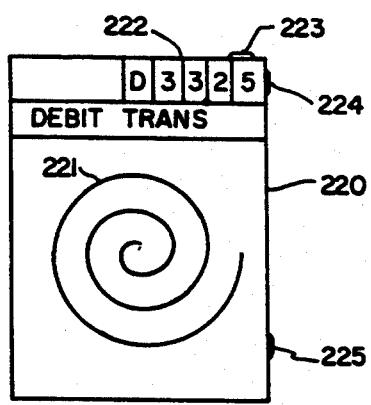

FIG. 2b shows external details of the PT.

Figure 2C:
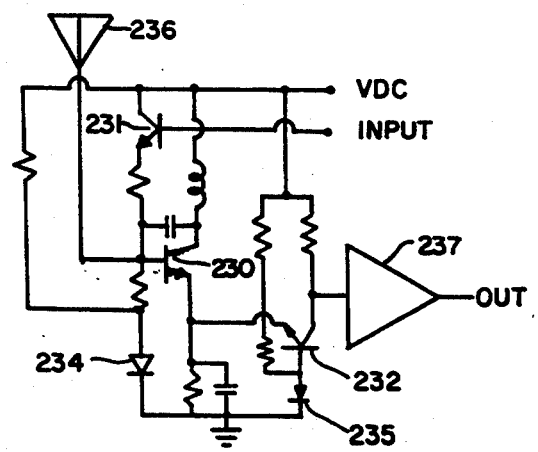

FIG. 2c describes a preferred half duplexed R/T.

Figure 2D:
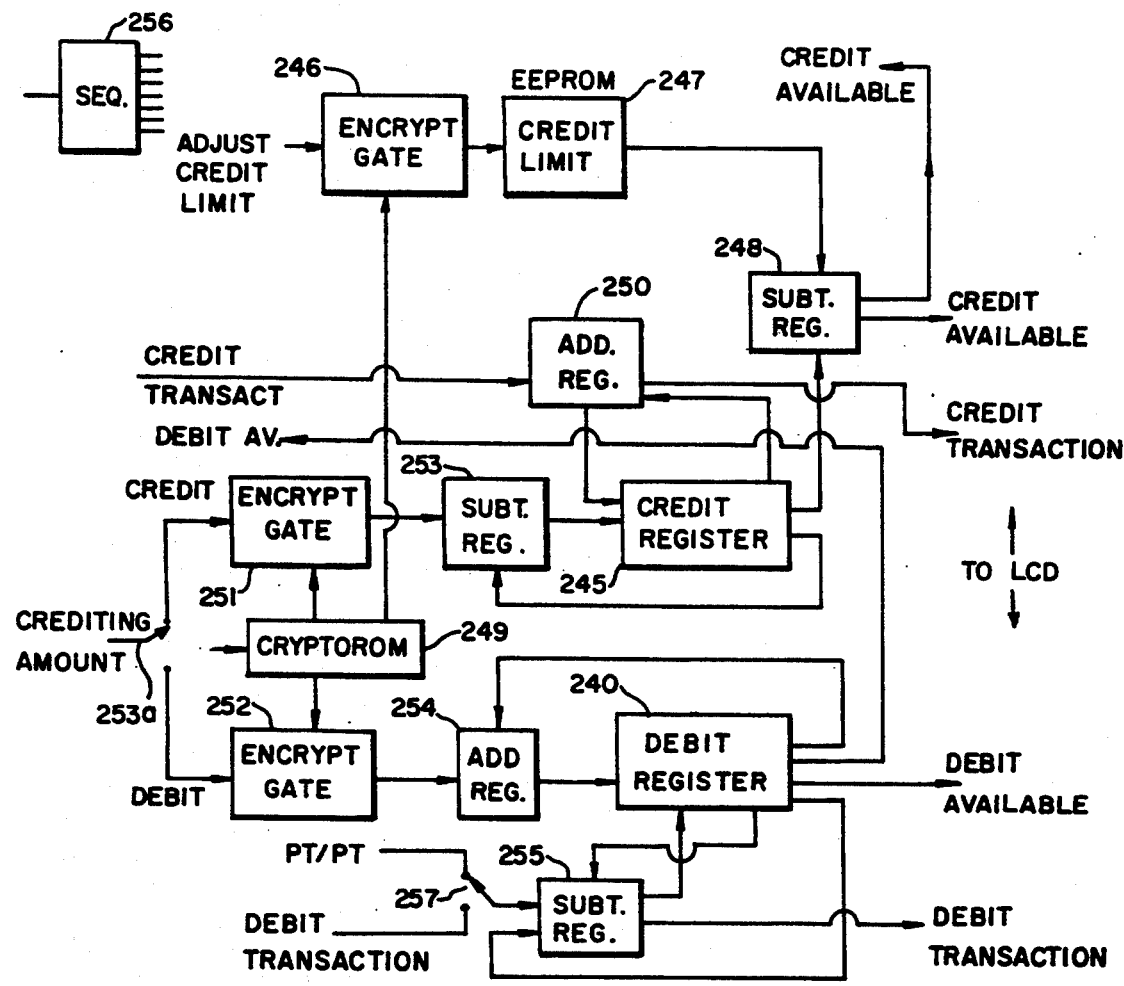

FIG. 2d shows specifics of the credit/debit block.

Figure 2E:
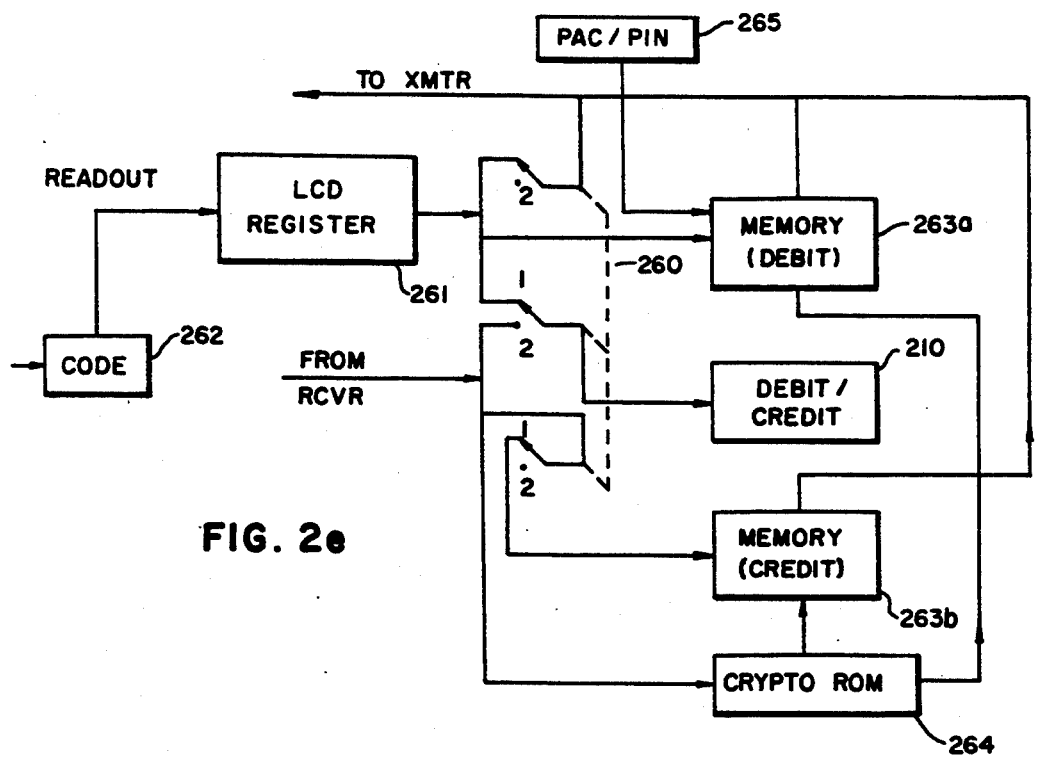

FIG. 2e shows specifics of the person-to-person transaction processer.

Figure 3A:
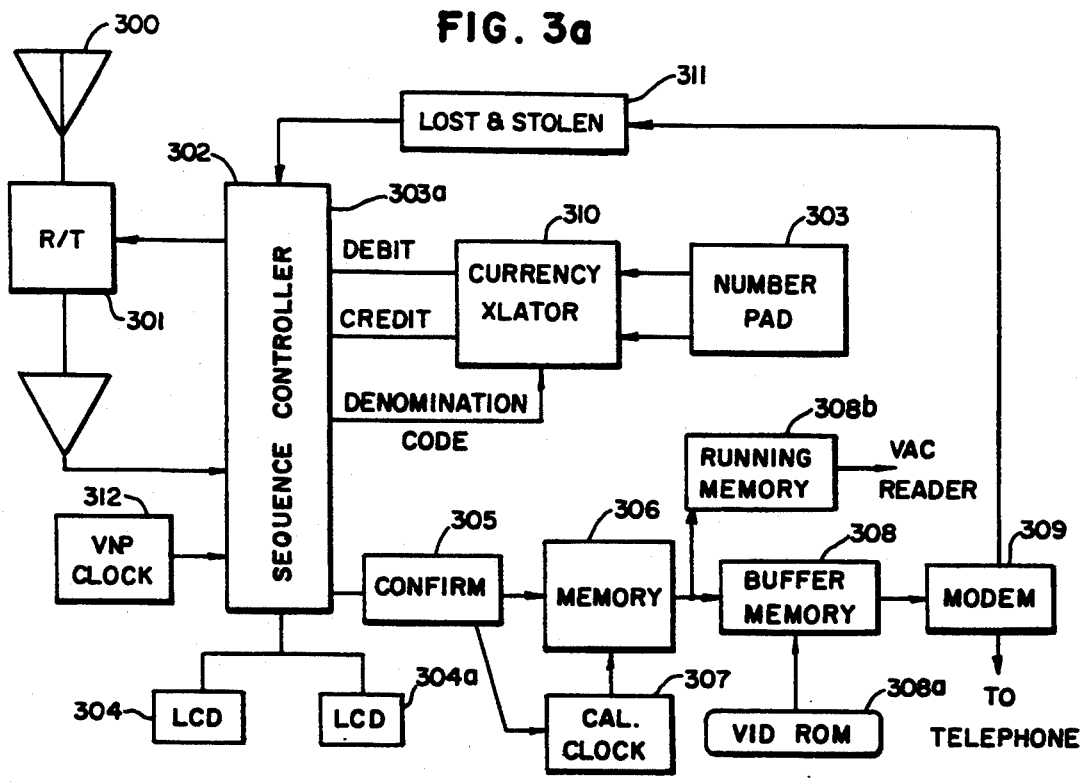

FIG. 3a illustrates a manual vendor terminal in block diagram.

Figure 3B:
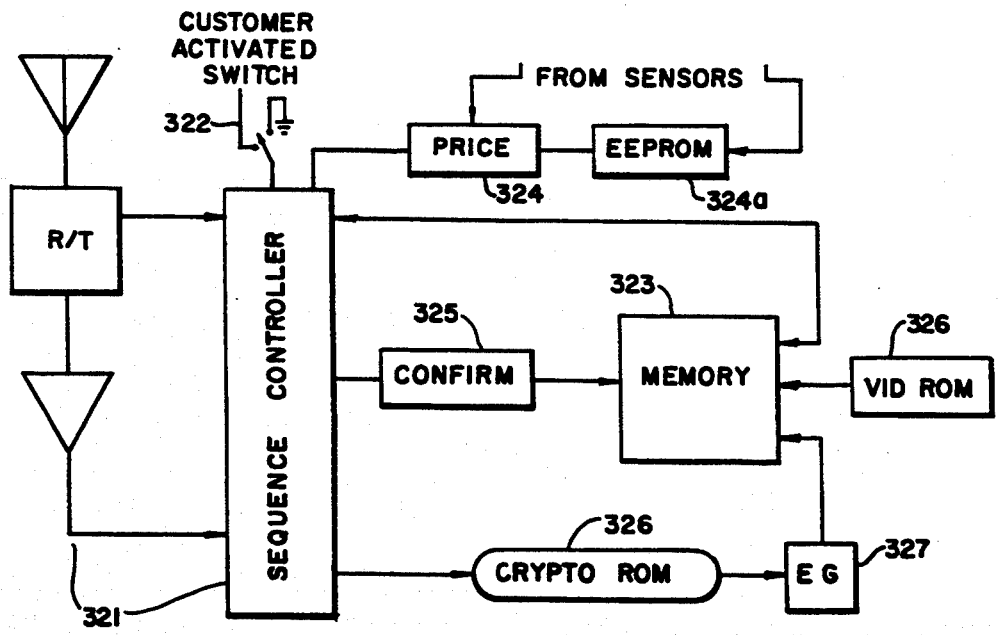

FIG. 3b illustrates an automated vendor terminal in block diagram form.

Figure 3C:
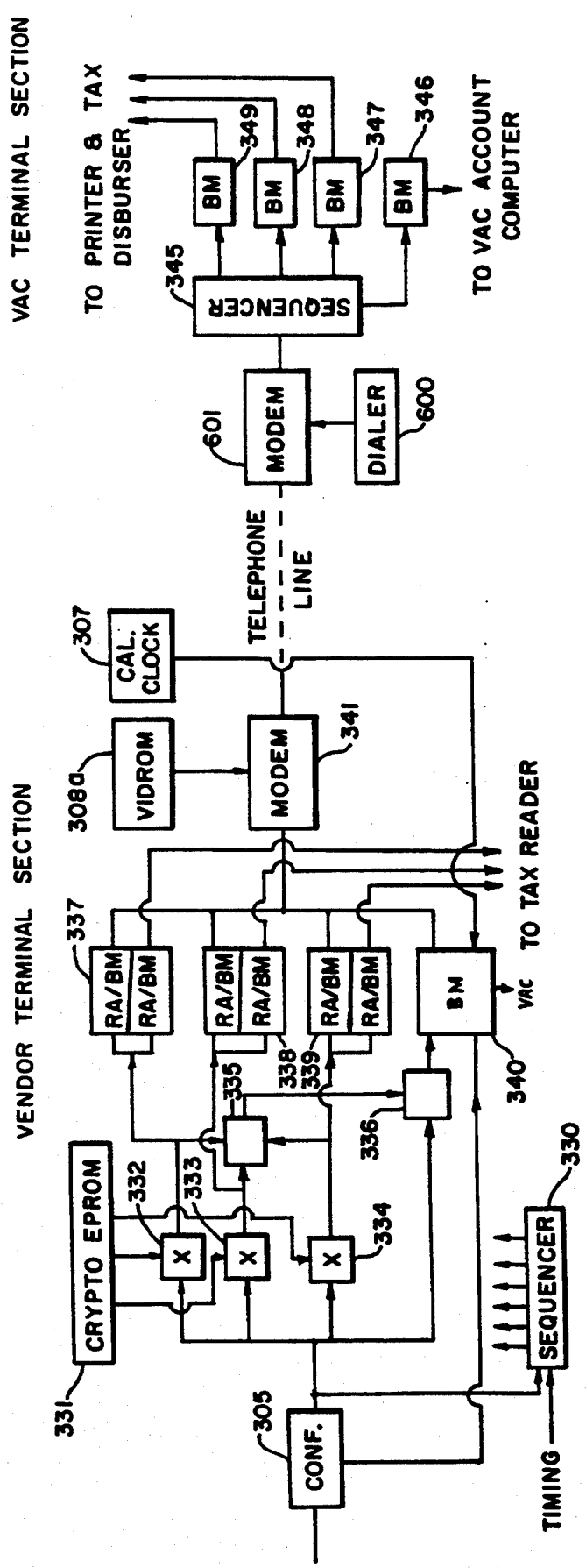

FIG. 3c shows the adaptations needed to incorporate automatic sales tax collection into the system.

Figure 4A:
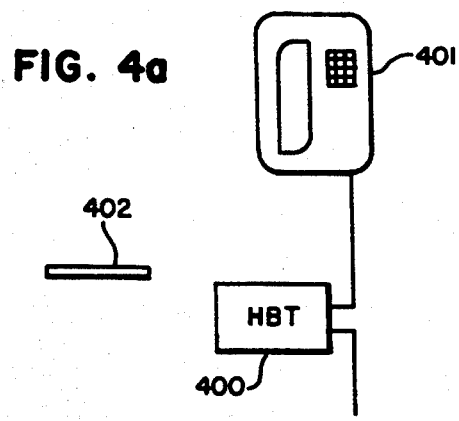

FIG. 4a shows how the HBT connects with the homebase telephone.

Figure 4B:
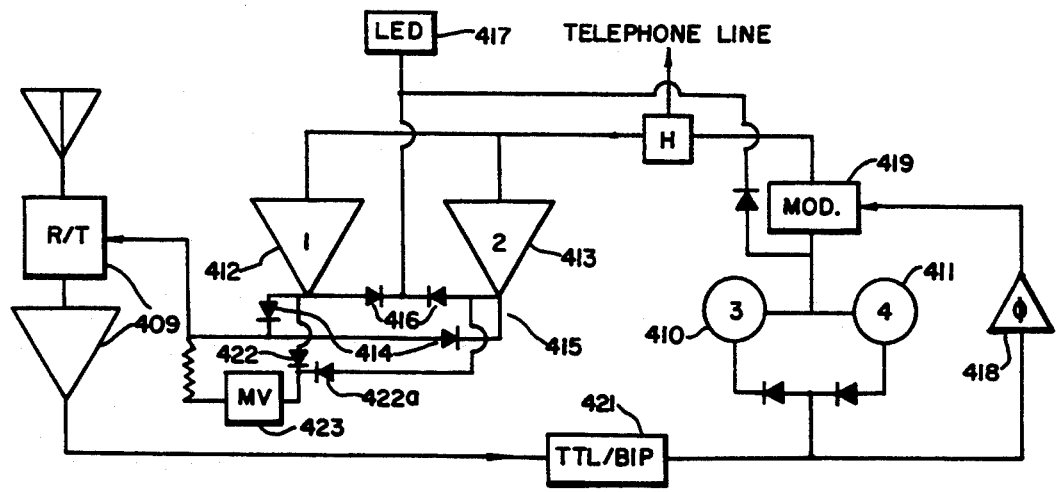

FIG. 4b describes some details of a preferred HBT modem.

Figure 5:
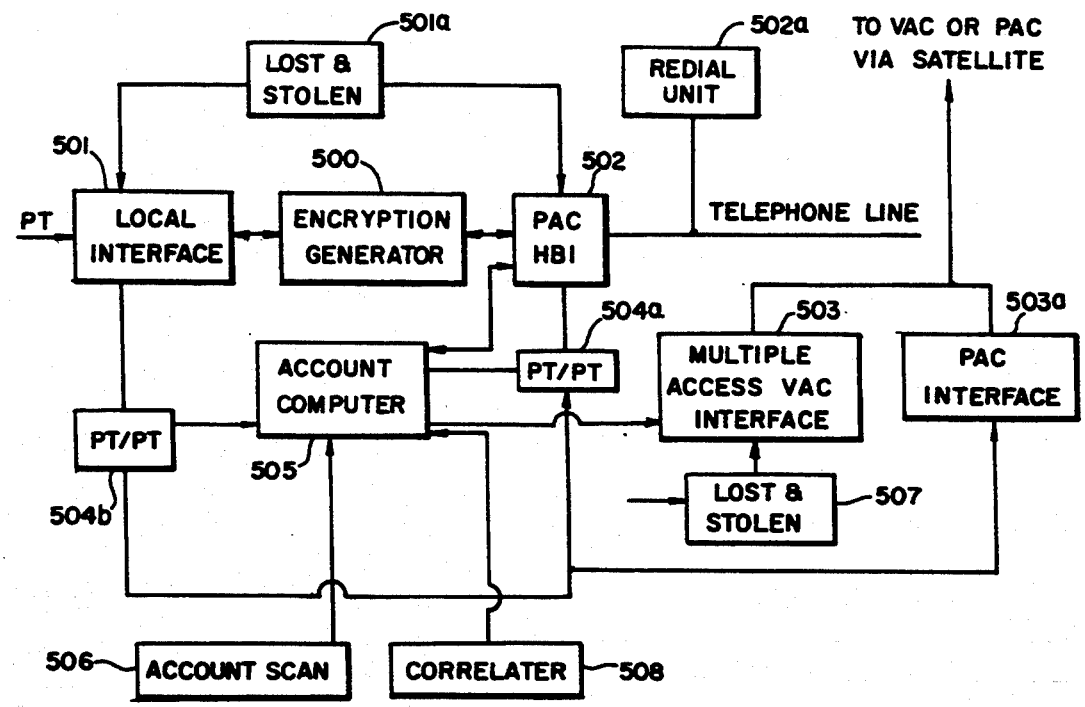

FIG. 5 illustrates the PAC subsystem in block diagram form.

Figure 6:
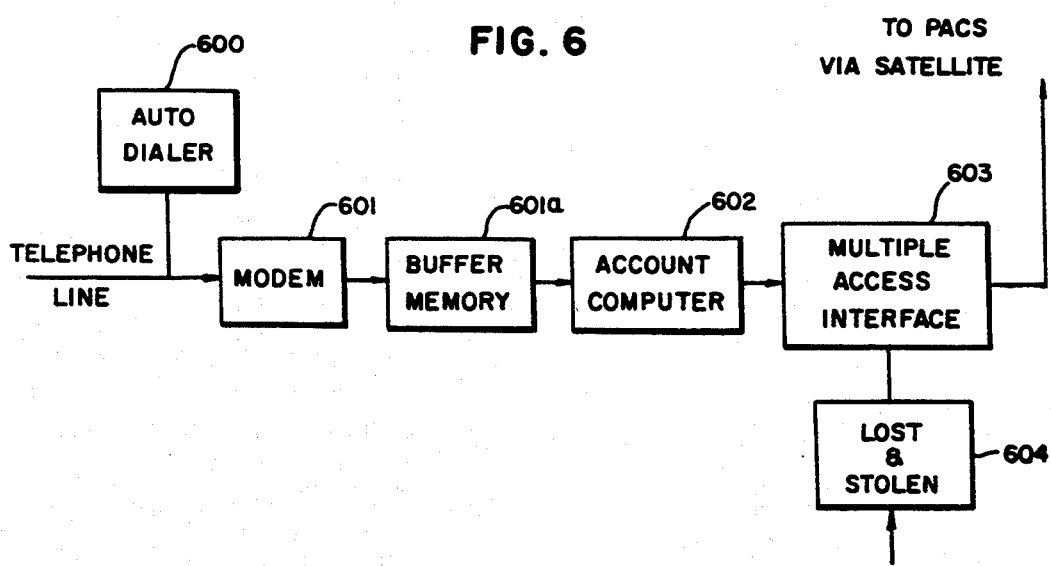

FIG. 6 describes the VAC subsystem in block diagram form.

DETAILED DESCRIPTION OF INVENTION

Figure 1A:
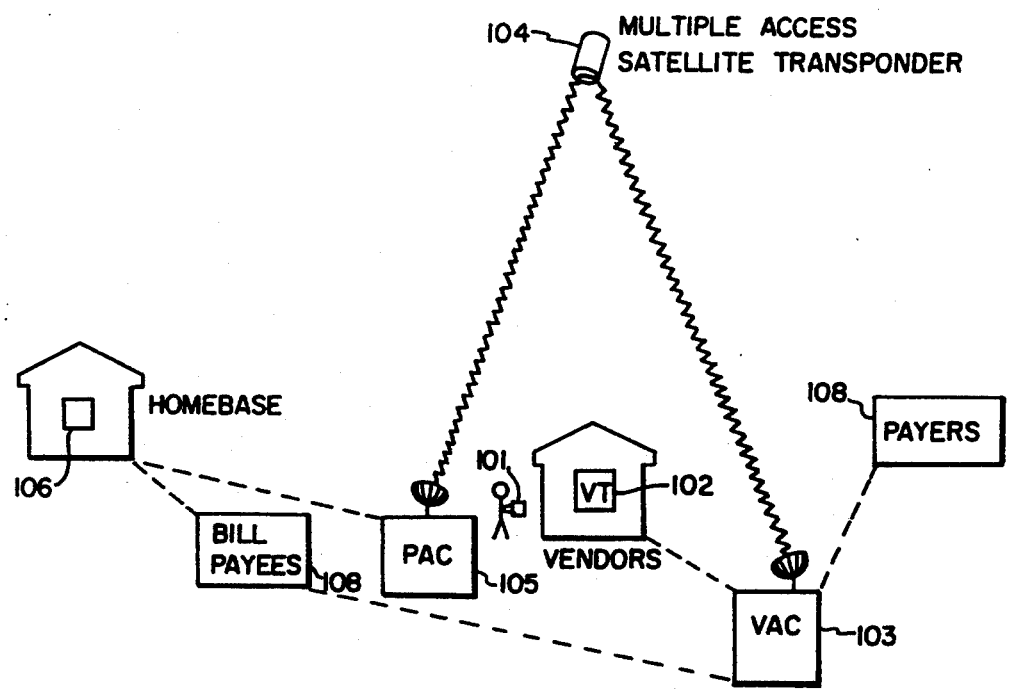
FIG. 1a illustrates pictorially how the system is configured.
Figure 1B:
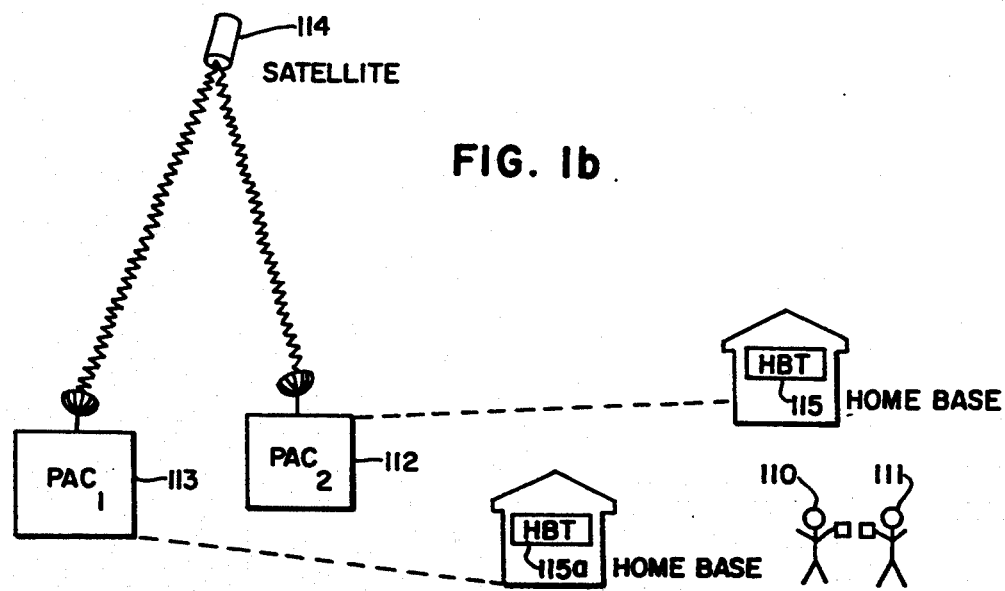
FIG. 1b illustrates pictorially how two PACs linkup to support person-to-person transactions.

Referring to the drawings, FIGS. 1a and 1b, show the overall electronic money system's operation in pictorial illustrations. The transaction packet, which is also the medium-of-exchange of this system, is created when an individual carrying personal terminal, PT,101, on their person wishes to conduct a transaction by bringing the PT in proximity with vendor terminal, VT, 102. The amount of the transaction is keyed in by the VT. The amount of the transaction is then debited from the PT's debit or credit account. Information that characterizes the transaction is accumulated in the VT where these characterizations are periodically transferred from the vendor terminal to a vendor's account custodian, 103, or VAC. The VAC credits the vendor's account in the amount of each transaction, and sorts the transactions into like-PAC batches, forwarding them via satellite transponder 104, which performs as a multiple access relay point, communicating with specified PACs in assigned time slots. Personal Account Custodian, or PAC 105, is the place where the PT's account is stored and from which the vendor's account is credited. The satellite serves, for this illustration, as a clearinghouse. (A true clearinghouse can be realized by use of relay ground stations which perform intermediary VAC/PAC sorting.) As a final step in the settlement process, each PAC periodically makes lump sum cash settlements with each VAC to balance all accounts.

The PT's debit and credit account is periodically credited, through homebase terminal, 106. Bill paying transactions occur when a telephone connection between payee and payer is made and amount of the bill is presented and acknowledged. The PT's account is debited by bill payee, 108, who acts as vendor. The payee transfers all accumulated collections to its VAC. The VAC credits payee's account and debits designated PAC accounts.

An individual, wishing to transfer funds from a cash account to his PT, preferably dials his PAC, transmits telephone number and hangs up, then places PT onto HBT interface surface, 106. PAC confirms number and returns call. PAC accesses PT's debit account credit entry port through a crypto gate and proceeds to credit that account with funds debited from a savings account, for example. Acknowledgements are made monthly.

Another type of transaction, referred to as PT/PT, would transfer funds between two individuals. FIG. 1b illustrates how this could take place. Payer 110 presses a button in his PT which steps the number shown on the PT's display to the payment that is to be transferred to recipient 111. The transaction is actuated by debiting the payer's PT account by the displayed amount and simultaneously transferring that amount into PT/PT memories located in the PT, one for crediting the other for debiting. The information stored includes PAC and PIN data lifted from the payer's PT. When the payee's PT is next in contact with its PAC, the stored PT/PT credit information is readout to payee's PAC, 113, where the payee's PT & PAC accounts are credited. The payer's PAC debits payer's PAC account with the amount obtained via satellite, for example, from the payee's debit memory.

FIG. 2a shows a functional block diagram of the preferred embodiment of a personal terminal, PT. It shows antenna 200 which receives and transmits microwave signals to and from receiver/transmitter, or R/T, 201 which operates in a half duplex mode. When R/T 201 is in its receive mode, amplifier 202 draws no current and latch switch, 203 is open, applying no voltage to microprocessor 204 from battery 205. The various functions of microprocesser 204 are indicated by blocks 207 through 213. Block 206 is a transaction sequence controller that triggers the various steps that comprise the transaction. Block 207 is a read-only-memory, or ROM, that contains permanent personal information, such as social security number, date of birth, and sex. It is from this information that a crypto entry code is derived to gain entry to the crediting port of account registers. Block 208 is an erasable-programable-ROM or EPROM which includes semi permanent information such as the personal account custodian's identification number, a nationality code, etc. Block 209 is a temporary memory that stores time and/or point of entry information to facilitate automated toll, mass transit, and parking transactions. Block 210 is where the debit/credit transaction occurs. This block is described in detail by FIG. 2d. Block 211 is the liquid crystal display unit or LCD. It provides running account information, transaction type being conducted, and guidance. Block 212 is a recycling transaction sequence number assignor. It assigns a sequentially advancing number to each transaction. Block 213 is the person-to-person transaction processor described in more detail by FIG. 2e. Block 214 is programable logic that is changed by manually activating push button switches 223,224, and 225.

FIG. 2b shows a preferred physical embodiment of the PT. The PT is enclosed in plastic case 220. Embedded in the plastic is spiral antenna 221 and liquid crystal display, LCD, 222 which displays running accounts and other transaction related information. Beneath this is optional LCD strip providing advisory operating information. Side buttons 223 and 224 might be used to read in the transaction amount and determine whether the transaction is to be credit or debit. Button 224 might be clicked n times to select the numeral for each decimal position. One click on button 225 could allow completion of the transaction. Two clicks on button 225 could display debit running account, and three clicks display credit running account. The first click on button 223 could turn-on PT. An end-of-transaction signal from the VT would turn-off the PT. Simultaneous pressure on buttons 223 and 225 could make the PT totally unresponsive. Simultaneous pressure on buttons 224 and 225 could activate PT for an automated interrogation. Four clicks on button 225 could configure the PT for a PT/PT transaction. This switching scenario can be simplified by relying more on the VT and verbal commands to set up many transactions.

FIG. 2c describes circuit details of a preferred half duplexed microwave receiver/transmitter that is comprised of gallium arsenide, field effect transistor, or FET, 230, transistors 231 and 232, and diodes 234 and 235. Transistor 231 and diode 234 bias FET 230 so when no input voltage is applied to transistor 231 the FET operates as a detector. When input voltage is applied, the positive feedback in the FET's circuit causes it to break into oscillation. Some of that oscillation feeds into antenna 236. Diode 235 biases transistor 232 so it draws zero current when there is no current drawn by the FET. The presence of microwave signal from antenna 236 causes dc current to flow in FET 230. This is amplified by transistor 232 and further amplified by amplifier 237, which draws zero current when quiescent.

FIG. 2d describes the operation of debit/credit processer 211. It is described as being implemented by hardwire-logic circuitry which can serve as the basis for developing a software algorithm to program a microprocesser. The heart of this processer is debit register 240, credit register 245 and crypto entry gates, 246, 251 and 252. The two registers retain the running balance of the debit and credit accounts. These registers use zero current drain or flash memory elements. The crypto gates restrict access for crediting these accounts. Access needs an entry code derived from the information stored in ROM 207. When the correct entry code is received, crypto gates 251 and 252 are opened. Credit/debit switch 253 is positioned depending on a personal decision as to whether the credit or debit register is to be credited.

The creditline limit is stored in electronically erasible PROM or EEPROM 247. This amount can be adjusted by access to crypto gate 246. The credit available is the difference between credit limit in 247 and the amount stored in 245. One adjustment procedure would have the creditline limit being fed to subtraction register 248 along with the output of credit register 245, whose readout is fed to the CREDIT AVAILABLE line and to the LCD. CREDIT TRANSACT line feeds add register 250 along with the input from the current account stored in credit register 245. The contents of credit register 245 is then erased and the new amount stored in add register 250 is fed into register 245. Add register 250 is then cleared. This upgrades the credit balance by the amount of the transaction. Crediting of the credit account occurs by feeding the amount to be credited through crypto gate 251 into subtract register 253 which initiates a similar transfer procedure as was described.

Crediting debit register 240 could use a similar process involving crypto gate 252 and add-register 254. DEBIT TRANSACT line feeds subtract-register 255 which is also inputed by the output from debit register 240. The difference is stored until register 240 is cleared. The new amount stored in register 255 is read into register 240.

The input to register 255 can also be changed by switch 257 to conduct a PT-to-PT transaction. Switch 257 is part of ganged switch 260 described in FIG. 2e. LCD 211 gets information from register 255 and from the debit or credit transactions stored in registers 250 and 255.

FIG. 2e illustrates how a person-to-person or PT/PT transaction could be conducted and how block 213 could be configured to support that transaction. When button 225 is clicked four times by both payer and payee, three-pole-single throw switch, 260, is moved from its normal position 2 into position 1. The payer's register 261, which is connected to LCD 211, has the amount of the transaction fed into it by pressing buttons 223 and 224 appropriately. The two PTs involved in the transaction are held in close proximity. The payer clicks button 225 a fifth time which fires initiator 262. This directs the amount stored in register 261 to be debited from the payer's running account and be fed into the payer's zero current drain debit memory, 263a, also payer's PIN and PAC-IDN is transmitted to the payee's zero current drain credit memory, 263b.

The PT/PT transaction's final step occurs when payee's PT is next in contact with its PAC. Then the crypto credit entry code is determined and the amount stored in the payee's credit memory is credited to payee's PT running account and also to its PAC account. The payer's PIN and PAC-IDN form part of a PT/PT addressed packet directed to the payer's PAC, sent via a PT/PT clearinghouse, where that transaction amount is debited from payer's PAC account.

FIG. 3a illustrates the functions of a typical manned vendor terminal, or MVT. It includes antenna 300, R/T 301, and sequence controller 302. The transaction process begins by selecting from verbal instructions whether the transaction is to be a credit or debit and the amount of the transaction by number pad 303. The proposed transaction would optionally appear on LCD 304 and 304a for viewing by both vendor and customer. Switch 303a initiates the transaction sequence by first activating the transmitter which, in turn, closes latch switch 203 and initiates a PT running account check. (This also triggers a check through lost or stolen file 311.) If the running account check is positive and the customer approves the transaction by clicking button 225, the transaction is consummated by inserting the transaction amount into the appropriate PT register where the new running balance is computed, followed by the transfer of the transaction amount, transaction type, sequential number, customer's PIN, PAC-ID into transaction packet organizing memory 306, where it is combined with time-of-transaction information readout from calendar-clock 307 and vendor's IDN readout from VID-ROM 308a. The transaction amount from number pad 303 and initial running balance from PT are fed into confirm block 305 where the PT's expected new running balance is computed and compared with the PT's actual new running balance as read out of the PT into block 305. If the two new balances are the same, a turn-off opens latch switch 203 and transfers the information stored in memory element 306 into buffer memory 308. The information stored in buffer memory 308 is periodically transferred to the vendor's account custodian, VAC.

The entire transaction can be timed by narrow pulse clock 312, which inserts its pulse train into sequence controller 302. These pulses, used for timing VT/PT transactional bytes, are sent via the transmitter portion of R/T 301. The narrow pulses do not interfere with the data pulses yet are easily handled by the microwave radio link between PT and VT.

In order to handle personal international transactions, currency translator 310 is inserted between number pad 303 and sequence controller 302. The nationality code received from the PT identifies the country of origin of the PT. A key selects the correct currency multiplier stored in translator 310 which converts the vendor's price into the PT's national currency so the transaction within the PT will occur in terms of its currency. The currency translator also generates two transaction packets one in terms of local currency, the second in terms of the PT's currency. The PT's PAC receives the transaction, via the VAC and an international clearinghouse, in terms of the PT's currency. The VAC credits the vendor's account in the local currency. Periodic lump sum settlements, via normal international funds transfer machinery, settle imbalances that develop between VACs of one nationality and PACs of another.

FIG. 3b describes a vendor terminal that would be used for small, automated transactions such as in vending machines, parking meters, toll plazas, mass transit etc. Each generic application would use a modified version of this basic terminal, referred to here as AVT.

An automated vendor terminal would include an R/T & sequence controller assemblage, 321, which is similar to that used in the PT. The functions associated with this sequencer include customer presence actuated-switch 322 which starts the transaction by turning on the AVT's transmitter, then turning on the PT and receiving its running debit account balance, PIN, and PAC information, determining that the PT's balance is adequate, feeding in the base price stored in EEPROM 324a which might be modified by price processer 324 prior to being fed through confirm processer 325, where the transaction is confirmed. The transaction packet is assembled and stored in memory, 323. Vendor unit IDN is fed into each packet from VID-ROM 328. Any price qualification information, such as vehicle axle count, would come from an external sensor and be fed into price adjustment processer 324.

The information in memory 323 is periodically readout by a portable interrogator, in the case of parking meters, buses, or by telephone request for others. The interrogation is preceeded by a crypto word which must match up with the code stored in crypto-ROM 326. When matchup occurs, entry gate 327 opens and reads out the contents of memory 323 into the interrogater's buffer memory. The interrogater's accumulated information is eventually fowarded to its VAC.

FIG. 3c illustrates how the VT and VAC can be adapted to include automated sales tax collection as part of the sales transaction. A preferred adaptation begins at transaction data entry unit 305. This feeds the purchase price into multiplier registers 332, 333, and 334 where it is multiplied by city, state, and federal tax multipliers. These multipliers are stored in crypto-EPROM 331. The tax multipliers are initially entered into this EPROM unit by a tax agent via a crypto controlled entry process. If there is no tax, the multiplier is zero. If the multiple should change, the EPROM can be reset with knowledge of the entry code.

The tax products computed are then summed together in add register 335. The sum total is added to the purchase price in add register 336. This amount, which is the net transaction amount, is then fed into memory unit 340. Each calculated tax amount is fed into respective running accumulator/buffer memory pairs 337, 338, or 339 where running sums are stored until requested. Sequencer 330 controls the computational sequence for each transaction. Calendar clock 307 feeds its time-of-transaction bytes into the transaction packet being assembled in memory unit 340. Data entry unit 305 feeds PAC and PIN information into memory unit 340 to complete the assembly of the transaction packet. The packets are readout and cleared by the VAC. A vendor identification number, retained in ROM 308a, is also inserted into the data stream.

Paired buffer memories 337 to 340 have one of their memory units readout and cleared by a tax entity's VAC telephone request. The second memory unit continues to accumulate tax data as a running sum of the tax amounts being collected. That running sum is readout, perhaps semiannually, by a tax agent, to serve as a cross check on the vendor's payment transfers. The communication between VAC and vendor memories would typically occur via switched phone line using modems 341 and 601, with dialer 600 initiating the interrogation.

Sequencer 345 initiates the readout from VT memories 337 to 339 into VAC memories 346 to 349. The contents of memories 347 to 349 are fed to a printer where permanent information for tax collectors is accumulated.

Memory 346 feeds its data into the VAC account computer.

FIG. 4a illustrates a homebase terminal, or HBT 401, which is connected to telephone 400. Its operation begins with an individual slipping PT 401 onto the HBT's transaction surface at a homebase location, dialing its PAC, sending the homebase telephone number and PIN, and then hanging up. The PAC terminal checks the phone number as correct for that PT and then redials it. An operator learns from the customer how much funds to transfer into the debit and/or credit accounts from the individual's personal account and then enters those amounts. While this is occuring, the PIN is fed into the encryption generator and the entry crypto code word is read back to the PT. The amount to be credited to each account is read in and confirmed. The individual's personal account, stored in the PAC's computer, is also debited by those same amounts. If the individual wishes to receive a loan for either account, this would also be appropriately registered. Finally the contents of both the person-to-person transaction memories are readout and cleared.

FIG. 4b illustrates circuit details for a preferred HBT modem. The data rates at which the PT normally operates in its transaction mode are much higher than that which can be supported by a phone line circuit. A preferred modulation method for the modem would be a double sideband suppressed carrier, amplitude modulation which is also frequency shift keyed by the presence of 1s or 0s. The sharp cusp created at the nulls of this modulation fires a one-shot multivibrator that generates a narrow pulse which clocks the operation of the PT so it matches that of the HBT telephone line data stream.

To implement this modem, bridged Tee oscillators 410 and 411, set at two separate audio freqencies, are keyed depending on whether a 0 or 1 is present. Bridged Tee amplifiers 412 and 413 amplify one or the other received frequency with each output being detected by oppositely poled diodes 414 and 415. Diodes 416 detect the presence of any signal causing LED 417 to flash as a visual busy signal. When there is no transaction, there are no signals present on the line so LED 417 turns off, and the line is cleared for normal telephone operation. The data output from the receiver port of R/T 409 actuates bridged Tee oscillators 410 and 411, and is fed into phase lock unit 418 to generate a sinewave whose zero crossovers track the input data train. The sinewave is fed to balanced modulator 419. The resulting modulated signal is then fed onto the telephone line via hybrid 420. The output from bridged Tee amplifiers 412 and 413 feed the transmitter port of R/T unit 409, which interacts with the PT lying on the transaction surface of HBT 400. The signals received from the PT are processed thru TTL/bipolar converter unit 421, whose bipolar output turns on either oscillator 410 or 411. The zero crossover cusp, detected by diodes 422 and 422a, is used to trigger one shot multivibrator 423, which generates a very narrow pulse that is superimposed onto the output of amplifier's 412 and 413.

FIG. 5 describes the operation of a personal account custodian's, or PAC, facility. A principal function of the PAC is to represent the individual customer much as a bank would. It also includes encryption generator 500 which receives PIN information from PTs wishing to credit their running accounts, and through a crypto process derives the unique entry code that has been burned permanently into the PT's crypto ROM when issued. When the entry code, deciphered from the PIN, matches that of the crypto gate, the crediting process proceeds. The crediting process can be conducted at PAC interface 501 on the PAC's premises or through a telephone connection with homebase terminal 502, with the redialing procedure carried out by unit 502a. VAC data is received via interface unit 503.

PT/PT transaction data is similarly taken from a PT via PT/PT interface unit 504a or 504b. The PT's PT/PT memory units are readout into 504a or 504b, one unit storing debits that are subtracted from the designated PAC account, and the second storing credits which are added to its designated account. Those accounts not in this PAC are fowarded to the designated PAC via clearinghouse that is interfaced by 503a.

Six separate processes occur at a PAC terminal. One is crediting PT accounts and debiting of PAC personal accounts. A second is debiting accounts with amounts entered by VACs. (Personal credit and debit accounts are held in account computer 505.) The third process is an account reconciliation conducted by account scanner 506. (Whenever a PT is interrogated its current accounts are routinely readout and compared with the amount held in the corresponding PAC account. When major discrepancies occur, that account is flagged for investigation.)

The fourth process spots potential vendor fraud and counterfeit PTs using clock/transaction-number correlater unit 508 which accumulates each PT's transactions with calendar-clock/transaction-numbers. The unit checks if the order of calendar times tracks transaction-sequence numbers. More specifically, each PT's transactions are collated in order of their numbered sequence. The calendar-clock data, which for example indicates a transaction occuring at 3:05 PM on Jan. 24, 1993 by a numerical tag of 93-1-24-1505 is subtracted from the subsequent numbered transaction and as long as the difference is positive the transactions are considered to be legitimate. This makes it easy to detect an out-of-order time sequence and to identify a suspect vendor or potential counterfeit duplicate PT for further investigation. This process pinpoints potential fraud perpetrators which the double entry reconciliation cannot do. The double entry reconciliation process is the last line of defense against counterfeiting of PTs.

The fifth process is the redialing procedure used to remotely credit a PT via telephone. A preferred redialing procedure includes sending the homebase telephone number to a PAC redialing unit, checking that number with a lookup table that lists approved numbers that any given customer could use in the crediting procedure and then redialing it.

The sixth process concerns local lost, stolen and counterfeit reports which are compiled in buffer memory unit 507 and sent to the VACs for forwarding to vendors. Lost & stolen PTs are reported by their owners to their PAC. These can be distributed via the clearinghouse to all VACs and then to appropriate VTs. Counterfeits are detected and reported by the PACs. If a PAC receives a PIN for which it has no record, that PT is reported as a potential counterfeit. If the counterfeit PT is listed with the addressed PAC, duplicate PTs would show up in the sequence correlator and be reported.

FIG. 6 is a block diagram that describes the functions of the vendor account custodian's facility. It includes automatic dialer 600 which routinely dials up each vendor to empty its transaction packets into buffer memory 601a through modem 601.

I claim:

1. An electronic money system; using transaction packets as its medium-of-exchange said packets being comprised of digital bytes that specify the transaction amount, type of transaction, settlement routing, nationality of base currency, and system security; is comprised of:

personal terminals, automated and semi automated vendor terminals, and an electronic banking network consisting of PACs, VACs, HBTs, and clearinghouses; said personal terminal being comprised of a receiver/transmitter, running debit and credit account registers, crypto crediting entry gate, liquid crystal display, and button switches that configure terminal to conduct a variety of transactions or to display running account balances; said vendor terminal being comprised of a receiver/transmitter, transaction amount entry means, memories, modem, and display; said vendor account custodian terminal being comprised of apparatus that periodically receives vendor's transaction packets from which it credits vendor's account and forwards said packets to designated PACs; said electronic clearinghouse being comprised of means to direct transaction packets from the various VACs to their specified personal account custodians; said personal account custodian terminal being comprised of means to receive and store individual transactions, means to debit individual running accounts using said transaction information, means to credit running accounts from cash deposits, means to generate crypto entry codes to gain crediting access to PT's running accounts, means to interact with PT via its homebase terminal, and means for detecting and pinpointing fraud, malfunction or error; and said homebase terminal being comprised of means for interfacing a telephone line to said PT to provide a convenient entry point into the electronic banking system.

2. Personal Terminal as claimed in claim 1 which conducts credit & debit transactions, pays bills, and interacts with VTs to conduct fully automated or semi automated transactions, incorporates:

side mounted, button switches that when pressed in specified sequences either inserts a number into said PT's display as a means of entering transaction data, or reprograms PT's internal logic to carry out any one of several transactional sequences, or authorizes consumation of a transaction, or completely deactivates the personal terminal, or displays running accounts.

3. Method for generating transaction packet claimed in claim 1, where said packet serves as the medium-ofexchange in said electronic transaction, is comprised of the following steps:
- a personal terminal(PT) and a vendor terminal(VT) are brought in proximity to each other, with either the PT or VT initiating the transaction, said initiation consisting of activating a very low power microwave radio transmitter which latches said PT's microprocesser to internal battery power;
- manually or automatically keying in transaction amount; check running account of PT, and if adequate proceed to add or subtract said transaction amount from specified credit or debit running account, transfer new balance to zero current drain memory;
- complete point-of-sale transaction by transferring PT's PAC-ID, PIN, and transaction number to VT, then deactivate PT; and
- assemble transaction packet in VT by combining PT's PIN, PAC-ID, and transaction number with VT's IDN, calendar-clock byte, and amount and type of transaction.

4. Method for detecting and pinpointing fraud, error, malfunction and counterfeiting throughout a far flung electronic money system as claimed in claim 1 consists of the following steps:
- constructing a security byte by combining the PT's sequential transaction number with the VT's calendar clock number;
- correlating said transaction sequence numbers with calendar-clock numbers for like PINs, then flagging PINs and VTs that contain out-of-sequence numbers;
- debiting both PT and PAC running accounts and periodically comparing them, and flagging discrepancies; and
- correlating flagged items from all PACs to pinpoint and confirm a suspect vendor, counterfeit PT, or equipment malfunction.

5. A method for automating sales tax collection and payment that is integrated into vendor terminal and VAC operation claimed in claim 1, is comprised of the steps of:
- multiplying the purchase price by VT stored tax multipliers with the products added together and then added to said purchase price to establish a net transaction amount;
- inserting said net transaction amount into a transaction packet and communicating said packet to a VAC for normal settlement;
- feeding each tax entity product into a pair of accumulating (running sum) registers, with one paired register being cleared after it transfers its running sum to tax entity's VAC, and the second register is readout and cleared only occasionally by said taxing entity serving only as a means for cross checking the automated tax collection process at its source; and
- tagging the running sum readout from each said register with a vendor ID and calendar-clock number so when each tax entity is paid with a lump sum, it can also independently get a printout with vendor's identity, the period over which the vendor's tax payment has accumulated, and the lump sum tax being paid by each vendor.

6. A system for detecting and localizing potential vendor fraud and counterfeit PTs, is comprised of:
- a recycling transaction number assignor, inserted in the personal terminal, said assignor retaining the previously assigned transaction number so when a new transaction is registered said assignor adds one to that stored number and reads out the new number as part of the transaction;
- a calendar-clock inserted in the vendor terminal that reads out and inserts numerical sequences representing time of day and date into the transaction packet, and
- a correlator in the PAC terminal that detects when said transaction number sequences for like-PIN packets are out of order when said calendar-clock numerical sequences are in progressing order, or the reverse, logging association VI-ION & PT's PIN.

7. Method for conducting transactions between personal terminals, PT/PT, is comprised of the steps of:
- pressing button switch to debit the payer's running account by an amount registered in payer's display;
- entering said registered amount into payee's PT/PT credit memory and payer's PIN and PAC-IDN into PT/PT debit memory; and
- during next interaction between payee's PT and its PAC, payee's credit memory is readout crediting payee's PT and PAC accounts, said debit memory's information being used to address the PT/PT packet, via PT/PT clearinghouse, to payer's PAC where payer's PAC account is debited by amount expressed in said packet.

8. A system that conducts and settles personal, international transactions, is comprised of:
- personal terminals that include a national currency code stored in its permanent memory to identify the nationality of PT's currency;
- vendor terminals with currency translators that store currency conversion multipliers and include means for identifying said national currency code, for selecting the appropriate currency multiplier, for multiplying transaction amount by said multiplier and for communicating the result back to a personal terminal where a normal point-of-sale transaction is consumated;
- means for assembling two transaction packets, one based on local currency and the other on the PT's home currency, and means for fowarding both packets to vendor's VAC; and
- vendor account custodian terminal with means for separating out the local currency transaction packet and crediting its amount to the vendor's account and forwarding PT's home currency packet to its designated PAC via an international clearinghouse for debiting.

* * * * *